United States Patent [19]

Inoue et al.

[11] Patent Number: 5,999,206
[45] Date of Patent: Dec. 7, 1999

[54] DEVICE FOR EXPANDING LIGHT-AMOUNT CORRECTION DYNAMIC RANGE

[75] Inventors: Yawara Inoue; Koji Tajima; Satoshi Uzawa; Katsuya Hiraga; Yawara Uchiyama, all of Mobara, Japan

[73] Assignee: Futaba Denshi Kogyo Kabushiki Kaisha, Mobara, Japan

[21] Appl. No.: 09/083,046

[22] Filed: May 22, 1998

[51] Int. Cl.$^6$ ...................................................... H04N 1/40
[52] U.S. Cl. .......................... 347/251; 347/183; 358/429; 358/455
[58] Field of Search ..................................... 347/251, 252, 347/191, 183, 184; 358/444, 429, 455; 395/109

[56] References Cited

U.S. PATENT DOCUMENTS

| | | | |
|---|---|---|---|
| 5,295,000 | 3/1994 | Nonoshita et al. | 358/444 |
| 5,604,526 | 2/1997 | Kwak | 347/191 |
| 5,717,839 | 2/1998 | Ichikawa | 395/109 |

Primary Examiner—N. Le
Assistant Examiner—Hai C. Pham
Attorney, Agent, or Firm—Oblon, Spivak, McClelland, Maier & Neustadt, P.C.

[57] ABSTRACT

A light-amount correction dynamic range expanding device that can increase the number of exposure gray levels without increasing the memory capacity of the storage section for light-amount correction. Input data is formed of (n+k) bits to increase exposure gray-scale level. A first look-up table stores the output densities to the number of exposure gray levels for photosensitive substances classified by photosensitivity. Of (n+k) bits output from the first table, a first selector selectively outputs only effective n bits to a second table 2 to use m bits needed for a photosensitive substance. The second look-up table stores brightness information to correct variations in brightness between luminous dots of a print head, with a memory capacity of n bits. A FIFO memory temporarily stores the brightness information. A selector 2 again converts the output from the FIFO memory into a (n+k)-bit form and ten it to a gray-scale control means. The gray-scale control means controls the gray scale of the print head with the (n+k) bit data, so that the brightness variation is corrected with n-bit data and with necessary and sufficient accuracy.

11 Claims, 5 Drawing Sheets

DEVICE FOR EXPANDING LIGHT-AMOUNT CORRECTION DYNAMIC RANGE

BACKGROUND OF THE INVENTION

1. Field of the Invention

This invention relates to a light-amount correction dynamic range expanding device. The light-amount correction dynamic range expanding device expands the exposure dynamic range by correcting the light amount of a printer head and is applied to optical color printers each which uses a fluorescent display tube as the light source of a print head to form an image on the photosensitive film.

2. Description of the Related Art

Optical printers such as color video printers utilize fluorescent display tubes each having plural luminous dots as a light source for a print head to form an image on a photosensitive medium coated with a photosensitive agent (e.g. photographic paper or photosensitive film).

Because of variations in brightness between luminous dots of the print head, the printer has a light-amount correction circuit to correct the brightness variation.

Figure 7:
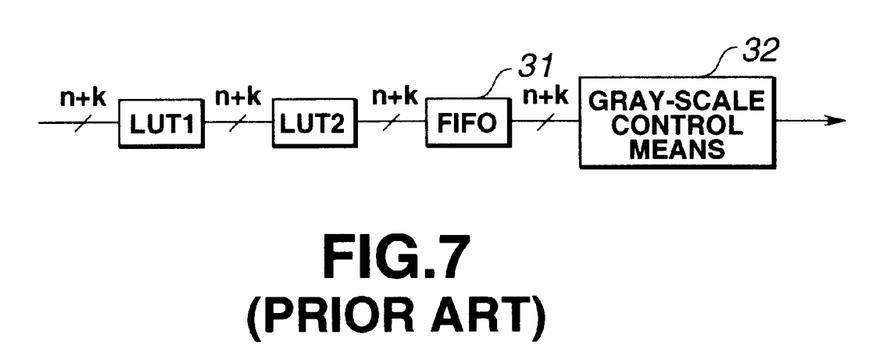
FIG. 7 is a conventional block diagram illustrating a light-amount correction dynamic range expanding device.

FIG. 7 is a block diagram illustrating a conventional light-amount correction circuit. The light-amount dynamic range of the optical printer which uses plural kinds of photosensitive substances with different sensitivities is expanded by increasing the number of exposure gray levels, that is, the bit width of input data and data for exposure process is increased.

For example, data of (n+k) bits in width (e.g. 11 bits when increment k is 3 bits) is used as image data by expanding input data of n bits in width (e.g. 8 bits).

The number of exposure gray levels corresponding to a photosensitive substance in use can be obtained to the input data by referring to the look-up table LUT1 which stores the characteristic curve corresponding to sensitivity correction, that is, density distribution of the photosensitive substance.

Thereafter, in order to correct the light-amount, that is, brightness variations between the luminous dots, the output density characteristic corresponding to an exposure gray level is obtained by referring to the look-up table LUT2 and then is temporarily stored into the temporary memory 31 such as FIFO. Then, the output density characteristic is output to the print head via the gray-scale control circuit (driver circuit) 32 of the print head.

However, even if the I/O data lines at each stage are configured in an (n+k) bit width (e.g. 11 bits in width), the light-amount measuring device merely provides its measurement precision of about 1% and cannot achieve more than 8-bit resolution ($1/256=0.4\%$). The look-up table LUT2 stores correction data to correct variations in brightness of each of dots of the print head. Even when the look-up table LUT2 is prepared based on data measured by the light-amount measuring device in the print head fabrication and the photosensitive medium is exposed with 8-bit resolution (256 levels of gray), the brightness of each luminous dot originally contains an error of about 2.5 levels of gray.

Hence, the precision of the light-amount measuring device cannot be improved even by increasing the number n of the I/O data lines to 8 bits or more in width. The bit increment k increases only the memory capacity of the look-up tables LUT2 and FIFO, without contributing to an increase in quality of the output image.

Moreover, an expensive memory device such as SRAM is used as the look-up table LUT2 which requires a high-speed accessing. Increasing unnecessarily the memory capacity of the look-up table LUT2 results in boosting the fabrication costs and in wasting the memory capacity.

SUMMARY OF THE INVENTION

The present invention is made to overcome the above-mentioned problems. The object of the invention is to provide a light-amount correction dynamic range expanding device that does not increase the memory capacity of the light-amount correction storage section even when the exposure gray level is increased to expand the exposure dynamic range, thus enabling low fabrication costs.

According to a first aspect of the present invention, a light-amount correction dynamic range expanding device, wherein the device corrects variations in brightness between luminous dots line-arranged on a print head and increases the number of exposure gray levels using a photosensitive medium on which plural photosensitive substances with different sensitivities are coated, comprises a first look-up table having a memory capacity corresponding to (n+k) bit input data expanded to store respective output densities corresponding to the number of exposure gray levels classified by kinds of all the photosensitive substances; a first selector for selecting the remaining n bits, except the sum (k) bits of the lower (m−n) bits and the upper (n+k−m) bits, among (n+k) bits of data output from the first look-up table in order to use as an exposure gray scale m bits ($n \leq m \leq n+k$) needed for the photosensitive substances; a second selector for selecting the remaining n bits, except the sum (k) bits of the lower (m−n) bits and the upper (n+k−m) bits, among (n+k) bits of data output from the first look-up table in order to use as an exposure gray scale m bits ($n \leq m \leq n+k$) needed for the photosensitive substances; a second look-up table arranged between said first selector and said second selector, for storing brightness information with a memory capacity corresponding to the n bits, the brightness information being used to correct variations in brightness between luminous dots of the print head; a temporary memory arranged between the first selector and the second selector, for storing exposure data for one line of the printer head with the memory capacity corresponding to the n bits; and gray-scale control means disposed at the rear stage of the second selector, for controlling the brightness of each of the luminous dots of the print head based on the data expanded to (n+k) bits.

In the light-amount correction dynamic range expanding device according to the present invention, the first selector converts (n+k) bits in width output from the first look-up table into n bits in width; and the second selector converts n bits in width output from the temporary storage memory into (n+k) bits in width.

In the light-amount correction dynamic range expanding device according to the present invention, the temporary memory comprises a FIFO (first-in, first-out) memory.

In the light-amount correction dynamic range expanding device according to the present invention, the second look-up table is serially connected to the temporary memory.

In the light-amount correction dynamic range expanding device according to the present invention, each of the first selector and the second selector implements a bit selection based on a control signal from a CPU (Central Processing Unit).

In the light-amount correction dynamic range expanding device according to the present invention, the first selector comprises a mechanical rotary switch; and the second selector comprises a mechanical rotary switch.

When the exposure gray level is increased to (n+k) bits to expand the exposure dynamic range, input data of (n+k) bits are input to the light-amount correction dynamic range expanding device.

The look-up table 1 stores output densities with resolution corresponding to (n+k) bits. The output densities correspond to the number of exposure gray levels of photosensitive substances with various types of sensitivities.

Of outputs of (n+k) bits from the look-up table 1, m bits are used for the exposure scale. Hence, the first selector 1 does not select the sum bits (k) of the lower bits (m−n) bits and the upper (n+k−m) bits but selects the remaining n bits to output it to the second look-up table.

The second look-up table that stores brightness information on correction of variations in brightness between luminous dots of the print head can be formed in a memory capacity configuration with an n-bit width. The temporary storage memory that stores brightness information on correction of variations in brightness between luminous dots of the printer head can be formed in a memory capacity configuration with an n-bit width.

The second selector expands the n-bit data output from the temporary storage memory to (n+k) bit data and sends it to the gray-scale control means.

The gray-scale control means subjects the print head with (n+k) bits resolution to gray-scale control but corrects variations in brightness based on the output of n bits in width from the temporary storage memory.

The above and other objects, features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

The embodiments according to the present invention will now be described below in detail with reference to the attached drawings.

Figure 1:
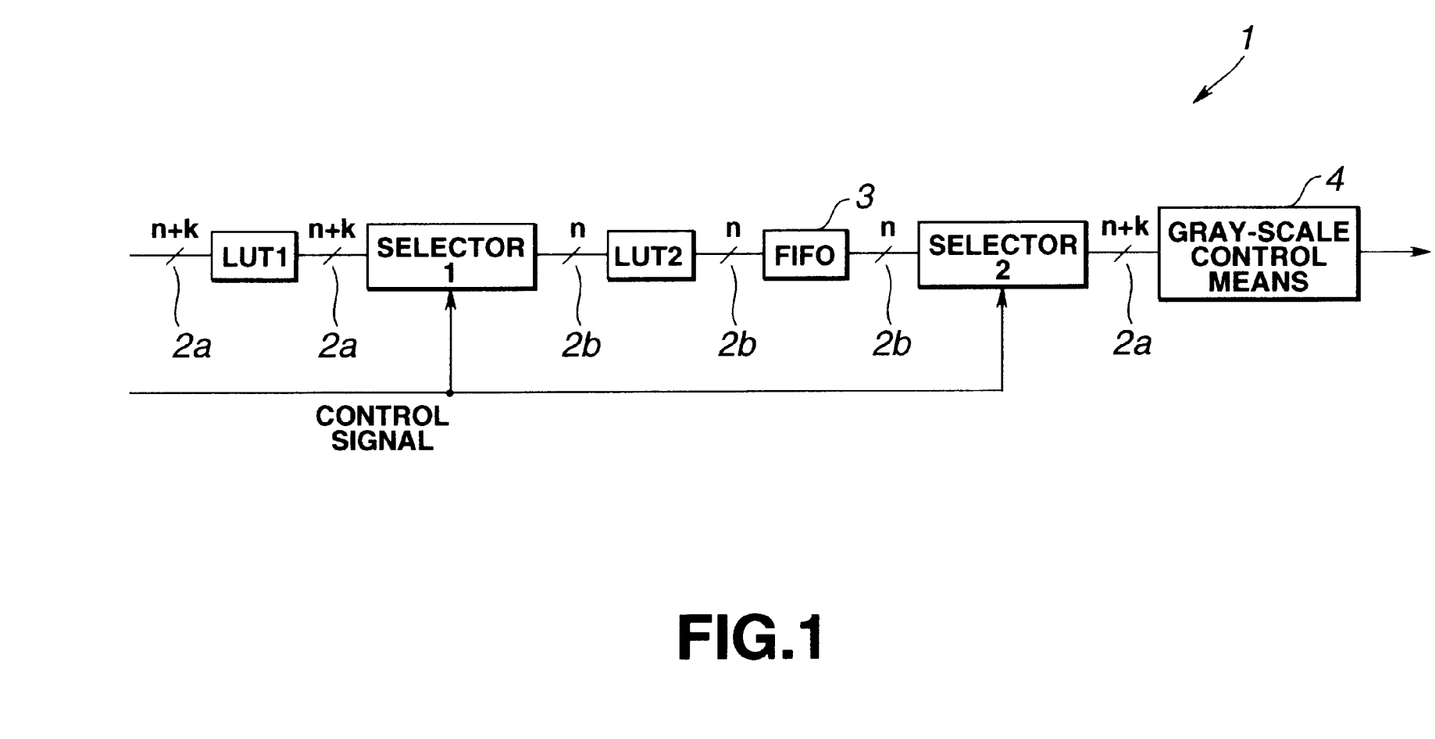
FIG. 1 is a block diagram illustrating a light-amount correction dynamic range expanding device according to an embodiment of the present invention.

FIG. 1 is a block diagram illustrating a light-amount correction dynamic range expanding device according to the present invention. In the light-amount correction dynamic range expanding device, like numerals represents the same constituent elements as those in the conventional device shown in FIG. 7.

Input data is input to the look-up table LUT1 which stores density distribution characteristic curves by discretely representing the sensitivity correction of a photosensitive film, that is, the density distribution characteristics of a photosensitive substance. The look-up table LUT1 is formed of a memory element such as RAM.

The input data has a predetermined width of (n+k) bits (the total bit of 11 where n=8 and k=3). The input data are input to the look-up table LUT1 via the corresponding bus lines of (n+k) bits in width.

Figure 2:
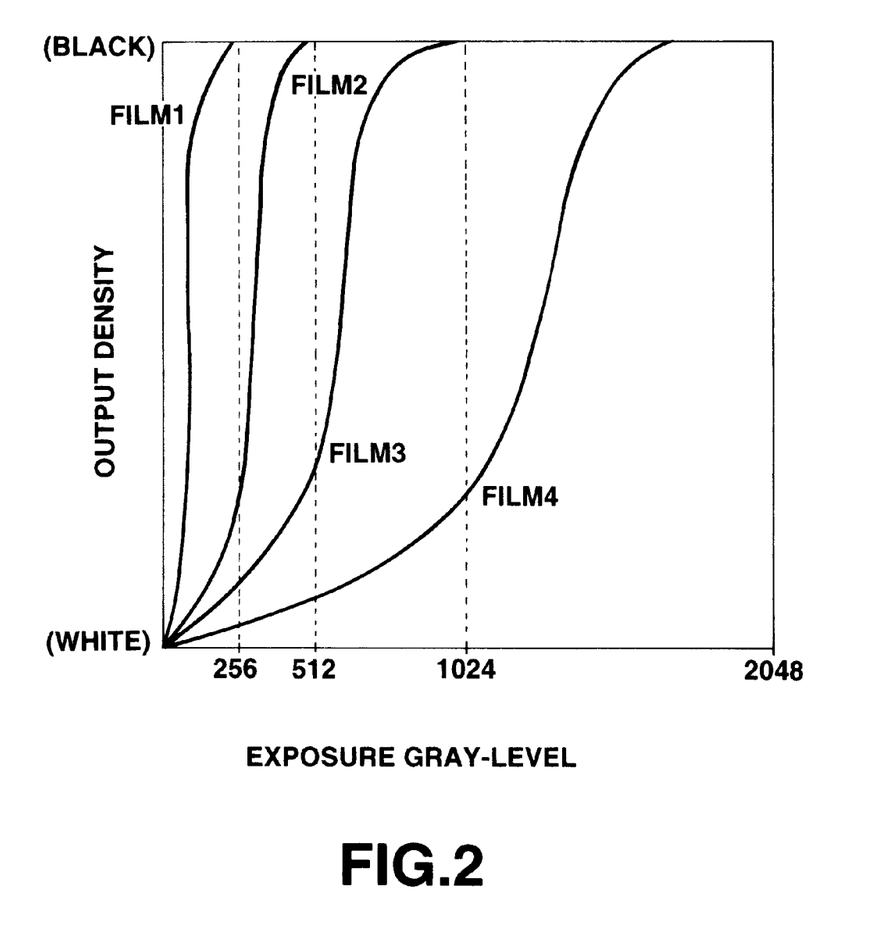
FIG. 2 shows the input to output characteristics of the look-up table 1 in the light-amount correction dynamic range expanding device and is the graph plotting the relationships between exposure and output density for films with different sensitivities.

The look-up table LUT1 outputs the number of exposure gray levels corresponding to a photosensitive film in use. FIG. 2 a graph plotting the input to output characteristics of the look-up table LUT1. The look-up table LUT1 outputs data on a predetermined density corresponding to a predetermined exposure amount indicated by the input data.

The look-up table LUT1 stores density distribution characteristic curves regarding the photosensitive film. The input to output relationships shown in FIG. 2 are obtained based on the density distribution characteristic curves.

In concrete, when the sensitivity of a photosensitive film is changed, the density distribution characteristic curve corresponding to the sensitivity is written into the look-up table LUT1.

The output of the look-up table LUT1 is connected to the selector 1. The selector 1 transforms (n+k) bits in width output from the look-up table LUT1 into n bits in width. The selector 1 selectively connects corresponding bus lines based on the control signal input from the control means (CPU) (not shown) via the control line. That is, of the bus lines 2b of 11 bits in width, the selected bus lines of 8 bits in width are connected to the bus lines 2b of 8 bits in width. The remaining bus lines of 3 bits in width are not connected to the bus lines 2b, but become an open state. This bit selection condition will be described later.

The selector 1 is connected to the look-up table LUT2 via the bus lines 2b of n bits. The look-up table LUT2 stores light-amount correction characteristics which correct variations in brightness between luminous dots of a print head, that is, output density characteristics corresponding to exposure gray levels.

The look-up table LUT2 is connected to the temporary storage memory 3 such as FIFO via the n-bit bus lines 2b. The temporary storage memory 3 temporarily stores data output from the look-up table LUT2.

Each of the look-up table LUT2 and the temporary storage memory 3 has a memory capacity which can store n-bit data.

The temporary storage memory 3 is connected to the selector 2 via the n-bit bus lines 3. The selector 2 converts n bits in width output from the temporary storage memory 3 into (n+k) bits in width. Like the selector 1, the selector 2 selectively connects the corresponding bus lines based on the control signal from the CPU. That is, of all the bus lines 2b of 8 bits in width, the selector 2 connects the selected bus lines of 8 bits in width to the bus lines 2a of 11 bits in width under bit selection conditions (to be described later). The remaining bus lines for 3 bits not directly connected are set at a fixed value of H or L.

The gray-scale control means 4 receives the output from the selector 2 via the bus lines 2a with (n+k)-bit width. The gray-scale control means 4 consists of a print-head driver IC. The gray-scale control means receives the input data with resolution of (n+k)-bit width (11 bits) to gray-scale control the exposure of the print head.

As shown in FIG. 2, the look-up table LUT2 has a 11-bit resolution corresponding to the number of exposure gray levels. The four curves correspond to different photosensitive substances. In this embodiment, four types of photosensitive substances have different sensitivities.

The film 1 is a film formed of a photosensitive substance with the highest sensitivity. In the films 2 and 3, the sensitivity of the photosensitive substance becomes gradually low. The film 4 is a film formed of a photosensitive substance with the lowest sensitivity.

As shown in FIG. 2, with the exposure gray level set to 11-bit resolution, the film 4 with the lowest sensitivity indicates that the density characteristic distribution is discretely plotted all over the gray levels (2048 gray levels). In the film 1 with the highest sensitivity, the density characteristic distribution saturates in the vicinity of 256 gray levels. The film 2 indicates that the density characteristic distribution is saturated in the vicinity of 512 gray levels. The film 3 indicates that the density characteristic distribution is saturated in the vicinity of 1026 gray levels.

As described above, where the number of exposure gray levels on the look-up table LUT2 is set to provide 11-bit high resolution and is adapted to the photosensitive film with the lowest sensitivity, the number of gray levels of a photosensitive film with a relatively higher sensitivity decreases substantially.

In order to solve such problems, an optimum bit combination of the bus lines 2b is selected for the photosensitive films 1 to 4. An n-bit (8 bit) bus connection is configured for all photosensitive films 1 to 4. FIGS. 3 to 6 are diagrams each showing the selective connection status between the selectors 1 and 2.

Where m-bit bus lines (where $n \leq m \leq n+k$) of the (n+k)-bit bus line 2a are used for exposure gray scale according to the sensitivity characteristic of a photosensitive film (photosensitive substance), the sum (k bits) of the lower (m−n) bits and the upper (n+k−m) bits are not selected but the remaining n bits are selected (bit selection condition).

Figure 3:
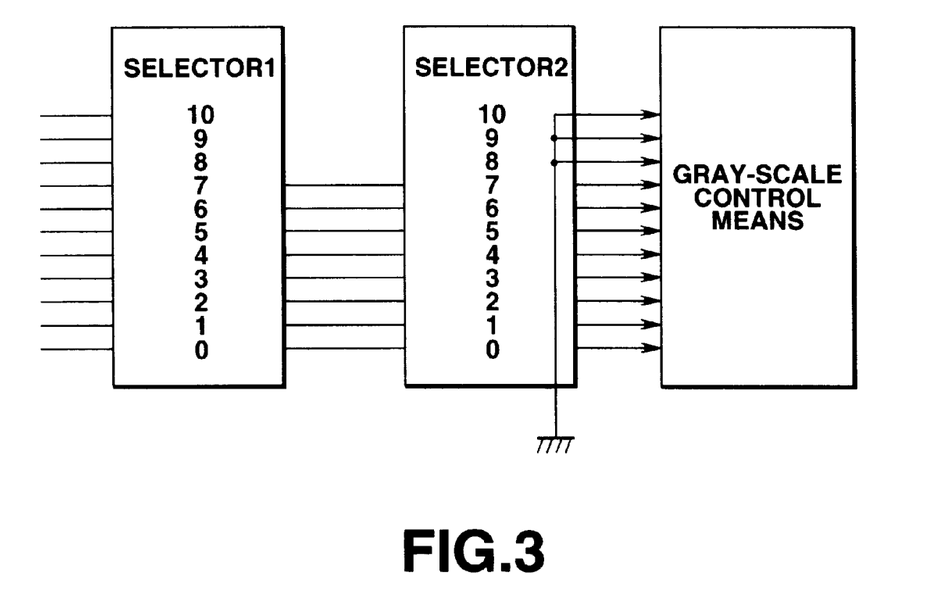
FIG. 3 is a block diagram illustrating the selectors 1 and 2 in an n-bit selection status (Case 1)

FIG. 3 shows a selective connection status of the film 1.

In an 11-bit resolution configuration, the output density of the high sensitivity film 1 saturates in the vicinity of 8 bits (256 gray levels). Hence, m=8, n=8 and k=3. Based on the above-mentioned bit selection condition, the upper 3 bits of all 11 bits are not connected to the bus lines 2a. The selector 1 opens the output ports for the upper 3 bits (bits 10, 9, and 8). The selector 2 sets the output ports for the upper 3 bits to a fixed value (L). Thus, the film 1 provides a 256 gray level (8-bit) resolution in one gray scale step.

Figure 4:
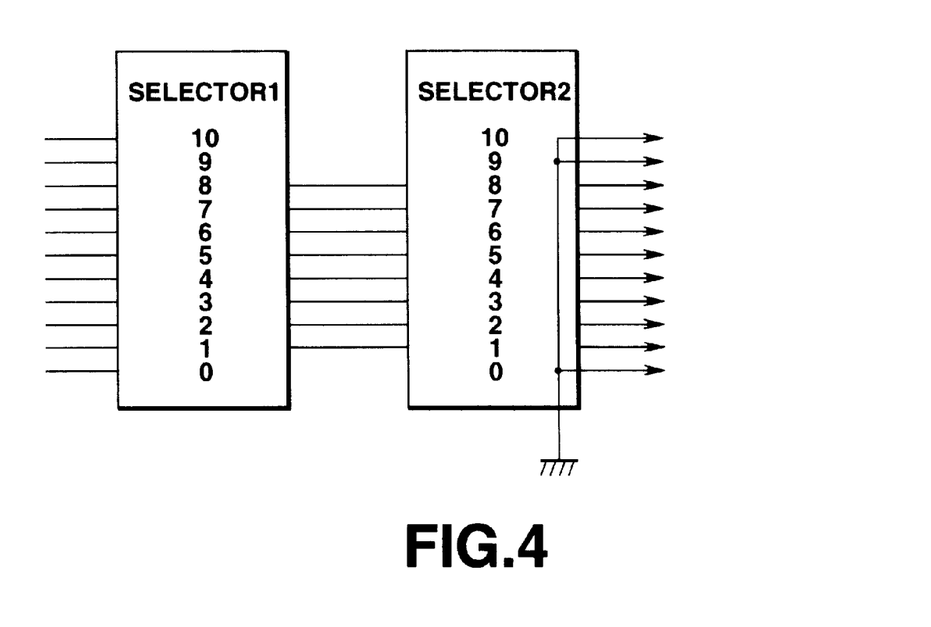
FIG. 4 is a block diagram illustrating the selectors 1 and 2 in an n-bit selection status (Case 2)

FIG. 4 is shows the selective connection status of film 2.

In an 11-bit resolution configuration, the output density of the film 2 with slightly higher sensitivity saturates in the vicinity of 9 bits (512 gray levels). Hence, m=9, n=8, and k=3. Based on the above-mentioned bit selection condition, the selector 1 opens the output ports for the upper 2 bits (bits 10 and 9) and the output port for the lowest bit (bit 0). The selector 2 sets the output ports corresponding to 0, 9 and 10 bits to a fixed value (L). Thus, the film 2 provides a 256 gray level (8-bit) resolution in two gray scale steps.

Figure 5:
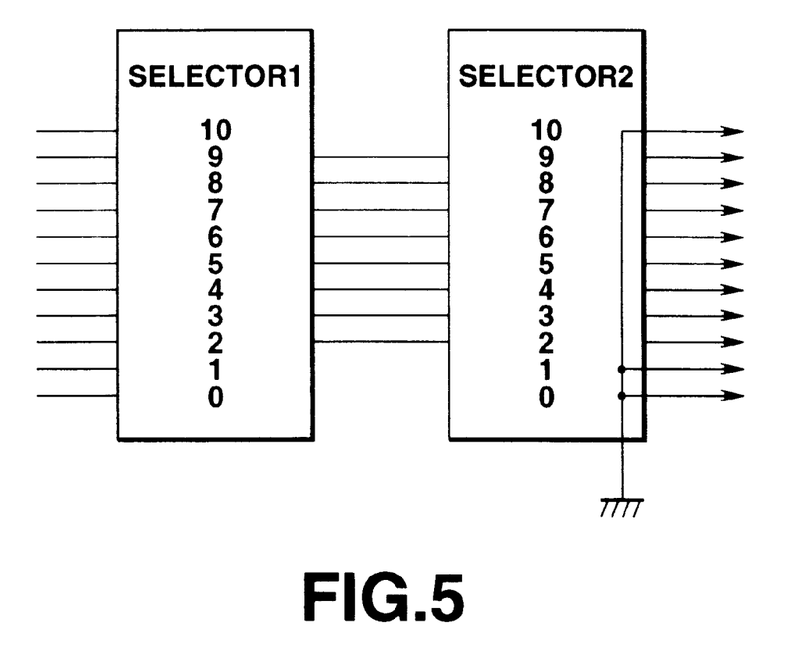
FIG. 5 is a block diagram illustrating the selectors 1 and 2 in an n-bit selection status (Case 3)

FIG. 5 shows a selective connection status of the film 3.

In an 11-bit resolution configuration, the output density of the lightly-low sensitivity film 3 saturates in the vicinity of corresponding to 10 bits (1024 gray levels). Hence, m=10, n=8, and k=3. Based on the above-mentioned bit selection condition, the selector 1 opens the output ports for the upper one bit (bit 10) and the output port for the lower bits (bits 0 and 1). The selector 2 sets the output ports corresponding to 0, 1 and 10 bits to a fixed value (L). Thus, the film 3 provides a 256 gray level (8-bit) resolution in four gray scale steps.

Figure 6:
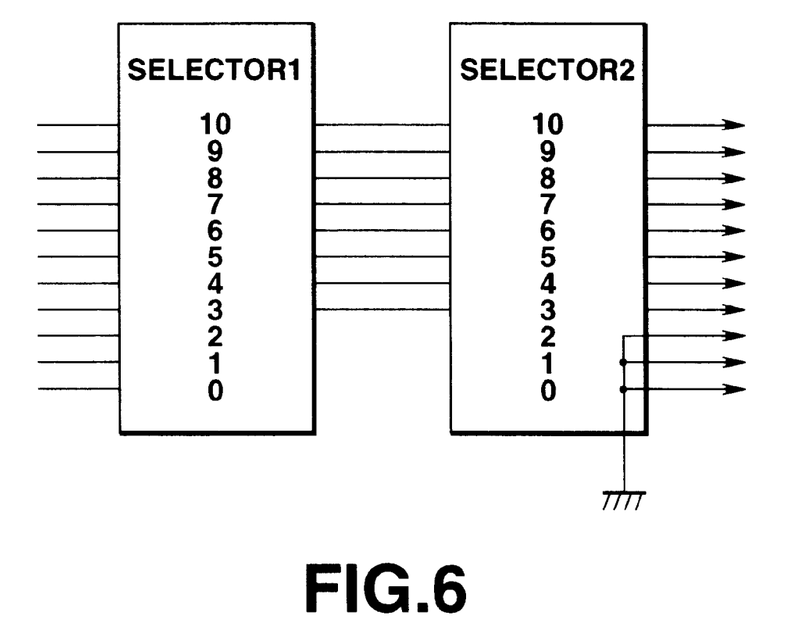
FIG. 6 is a block diagram illustrating the selectors 1 and 2 in an n-bit selection status (Case 4)

FIG. 6 shows a selective connection status of the film 4.

In an 11-bit resolution configuration, the output density of the lowest sensitivity film 4 saturates in the vicinity of corresponding to 2048 gray levels. Hence, m=11, n=8, and k=3. Based on the above-mentioned bit selection condition, the selector 1 opens the output ports for the lowest three bit (bits 0, 1 and 2). The selector 2 sets the output ports corresponding to 0, 1 and 2 bits to a fixed value (L). Thus, the film 4 provides a 256 gray level (8-bit) resolution in eight gray scale steps.

As described above, both the look-up table LUT2 and the temporary storage memory 3, each which has a memory capacity corresponding to 8 bits, can be inserted between the selectors 1 and 2 by establishing an 8-bit configuration between the selectors 1 to 8 for all the films 1 to 4. This configuration can prevent the look-up table LUT2 and the temporary storage memory 3 from inviting an increase in waste memory capacity.

In order to select effective n bits corresponding to plural kinds of films, the control signal is input to the selectors 1 and 2 based on the following formula (1):

$$x \geq \log_2(k+1) \tag{1}$$

(where x is a minimum integer)

Hence, when the four kinds of films are used, four control signals can be selected with two bits based on the formula (1). In this case, two control lines connect between the selectors 1 and 2 and the CPU.

The above-mentioned configuration includes the selectors 1 and 2 formed of a selector IC and implements the bit selection based on the control signal from the CPU via the control line. Each of the selectors 1 and 2 may be formed of a mechanical rotary switch.

According to the present invention, even when the number of the exposure gray levels are incremented to (n+k) bits to expand the exposure dynamic range, only effective n bits are selectively passed between the selectors 1 and 2 so as to correspond to m bits necessary for a photosensitive substance to be used. The memory section are inserted between the selectors 1 and 2 to store and correct brightness variations of the print head so that the brightness variations can be corrected with a necessary and sufficient accuracy and with the minimum memory capacity.

This feature enables an increase in the number of exposure gray levels and an expanded exposure dynamic range, without an increase in fabrication costs.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A device for expanding a light-amount correction dynamic range, wherein said device corrects variations in brightness between luminous dots line-arranged on a print head and increases a number of exposure gray levels using a photosensitive medium on which plural photosensitive substances with different sensitivities are coated, comprising:

a first look-up table having a memory capacity corresponding to (n+k) bit input data expanded to store respective output densities corresponding to the number of exposure gray levels classified by said photosensitive substances;

a first selector configured to select n bits among (n+k) bits of data output from said first look-up table, excluding the lower (m−n) bits and the upper (n+k−m) bits, in order to use as an exposure gray scale m bits (n≦m≦n+k) needed for said photosensitive substances, wherein n, m and k are integers;

a second selector configured to select n bits among (n+k) bits of data output from said first look-up table, excluding the lower (m−n) bits and the upper (n+k−m) bits, in order to use as an exposure gray scale m bits (n≦m≦n+k) needed for said photosensitive substances;

a second look-up table arranged between said first selector and said second selector, configured to store brightness information with a memory capacity corresponding to said n bits, said brightness information being used to correct variations in brightness between luminous dots of said print head;

a temporary memory serially connected to said second look-up table and arranged between said first selector and said second selector, configured to store exposure data for one line of said print head and having a memory capacity corresponding to said n bits; and a gray-scale control device disposed at a rear stage of said second selector, configured to control the brightness of each of said luminous dots of said print head based on said data expanded to (n+k) bits.

2. The light-amount correction dynamic range expanding device defined in claim 1, wherein said first selector converts (n+k) bits in width output from said first look-up table into n bits in width; and wherein said second selector converts n bits in width output from said temporary memory into (n+k) bits in width.

3. The light-amount correction dynamic range expanding device defined in claim 1, wherein, said temporary memory comprises a FIFO (first-in, first-out) memory.

4. The light-amount correction dynamic range expanding device defined in claim 1, wherein, each of said first selector and said second selector implements a bit selection based on a control signal from a CPU (Central processing Unit).

5. The light-amount correction dynamic range expanding device defined in claim 1, wherein said first selector comprises a mechanical rotary switch; and wherein said second selector comprises a mechanical rotary switch.

6. A device for expanding a light-amount correction dynamic range, wherein said device corrects variations in brightness between luminous dots line-arranged on a print head and increases a number of exposure gray levels using a photosensitive medium on which plural photosensitive substances with different sensitivities are coated, comprising:

a first look-up table having a memory capacity of (n+k) bit input data expanded to store respective output densities corresponding to the number of exposure gray levels classified by said photosensitive substances;

a first selector configured to select a maximum of n bits among (n+k) bits of data output from said first look-up table, excluding the lower (m−n) bits and the upper (n+k−m) bits, in order to use as an exposure gray scale m bits (n≦m≦n+k) needed for said photosensitive substances, wherein n, m and k are non-zero integers;

a second selector configured to select a maximum of n bits among (n+k) bits of data output from said first look-up table, excluding the lower (m−n) bits and the upper (n+k−m) bits, in order to use as an exposure gray scale m bits (n≦m≦n+k) needed for said photosensitive substances;

a second look-up table arranged between said first selector and said second selector, configured to store brightness information, said brightness information being used to correct variations in brightness between luminous dots of said print head;

a temporary memory arranged between said first selector and said second selector, configured to store exposure data for one line of said print head and having a memory capacity no greater than said n bits; and a gray-scale control device disposed at a rear stage of said second selector, configured to control the brightness of each of said luminous dots of said print head based on said data expanded to (n+k) bits.

7. The light-amount correction dynamic range expanding device defined in claim 6, wherein said second look-up table is serially connected to said temporary memory.

8. The light-amount correction dynamic range expanding device defined in claim 6, wherein said first selector converts (n+k) bits in width output from said first look-up table into n bits in width; and wherein said second selector converts n bits in width output from said temporary memory into (n+k) bits in width.

9. The light-amount correction dynamic range expanding device defined in claim 6, wherein, said temporary memory comprises a FIFO (first-in, first-out) memory.

10. The light-amount correction dynamic range expanding device defined in claim 6, wherein, each of said first selector and said second selector implements a bit selection based on a control signal from a CPU (Central processing Unit).

11. The light-amount correction dynamic range expanding device defined in claim 6, wherein said first selector comprises a mechanical rotary switch; and wherein said second selector comprises a mechanical rotary switch.

* * * * *

UNITED STATES PATENT AND TRADEMARK OFFICE
CERTIFICATE OF CORRECTION

PATENT NO. : 5,999,206
DATED : December 7, 1999
INVENTOR(S) : Yawara Inoue et al.

It is certified that error appears in the above-identified patent and that said Letters Patent is hereby corrected as shown below:

Title page,
Item [30], the Foreign Application Priority Data has been omitted. It should read:

-- [30] Foreign Application Priority Data
Jun. 6, 1997 [JP] Japan................9-149336 --

Signed and Sealed this

Sixteenth Day of April, 2002

*Attest:*

JAMES E. ROGAN
*Attesting Officer*            *Director of the United States Patent and Trademark Office*